United States Patent
Norman

(10) Patent No.: US 7,510,063 B2
(45) Date of Patent: Mar. 31, 2009

(54) FLUIDIC STABILIZER WITH REMOTE CONTROL

(76) Inventor: Ralph S. Norman, 8715 Dead Stick Rd., San Diego, CA (US) 92154

(*) Notice: Subject to any disclaimer, the term of this patent is extended or adjusted under 35 U.S.C. 154(b) by 36 days.

(21) Appl. No.: 11/062,278

(22) Filed: Feb. 17, 2005

(65) Prior Publication Data

US 2006/0006029 A1   Jan. 12, 2006

Related U.S. Application Data

(63) Continuation-in-part of application No. 10/166,498, filed on Jun. 10, 2002, and a continuation-in-part of application No. 10/801,626, filed on Mar. 15, 2004, now abandoned.

(51) Int. Cl.
*F16F 9/14* (2006.01)
(52) U.S. Cl. ........................... 188/310; 188/306
(58) Field of Classification Search ............ 251/209, 251/297, 309, 284; 188/306, 310, 290; 280/90, 280/272
See application file for complete search history.

(56) References Cited

U.S. PATENT DOCUMENTS 2,072,761 A * 3/1937 Lum ..................... 137/561 R
3,623,697 A * 11/1971 Austin ......................... 251/81
4,523,608 A * 6/1985 Miller .................... 137/315.19
4,747,944 A * 5/1988 George ................... 210/167.28
4,773,514 A * 9/1988 Gustafsson ................ 188/306
4,789,000 A * 12/1988 Aslanian ..................... 137/556
5,492,033 A * 2/1996 Hopey ....................... 74/551.1
5,516,133 A * 5/1996 Motrenec et al. ............ 280/272
6,726,232 B2 * 4/2004 Hasegawa et al. ........... 280/272
6,802,519 B2 * 10/2004 Morgan et al. .............. 280/272
2004/0195062 A1 * 10/2004 Anderfaas et al. ........ 188/267.2

* cited by examiner

*Primary Examiner*—Robert A Siconolfi
*Assistant Examiner*—Vu Q Nguyen
(74) *Attorney, Agent, or Firm*—Fehr Law Firm; Thompson E. Fehr

(57) ABSTRACT

A fluidic stablilizer with remote control having every portion of the circuit which connects the housing and the remote control valve within a range that will permit fluid placed in the circuit to flow freely at high speed but that will also create the fluid pressure necessary for effective damping. Furthermore, the cross-sectional area for every portion of the circuit is maintained within such range, preferably by constructing all portions of the circuit between the housing and the remote control valve with stainless steel braided line. And an attachment structure combined with a depression in the bottom of the rotatable wiper contained within the housing except with an aperture exposing the bottom of the rotatable wiper to the outside facilitates mounted the housing below the handlebars of a vehicle since the depression is constructed with such dimensions as to accommodate a stem nut at the top of a steering shaft.

68 Claims, 15 Drawing Sheets

FLUIDIC STABILIZER WITH REMOTE CONTROL

CROSS-REFERENCE TO RELATED APPLICATION

This is a continuation-in-part of U.S. application Ser. No. 10/166,498, filed on Jun. 10, 2002, and also a continuation-in-part of U.S. application Ser. No. 10/801,626, filed on Mar. 15, 2004 now abandoned.

BACKGROUND OF THE INVENTION

1. Field of the Invention

This invention relates to a device that uses a fluid to dampen a force which tends to move the plane of rotation of a steerable wheel or wheels of a vehicle having a shaft used to steer such wheel or wheels away from being generally parallel to the frame of such vehicle. It also relates to such a device for any steering mechanism, such as a ski of a snowmobile or the exhaust jet of a personal watercraft, that uses a shaft or the like and a handlebar or the like in the steering process. For convenience, the term "motorcycle" will be used herein; this term includes, though, not only a traditional motorcycle but also any vehicle using a steering mechanism as discussed in the preceding sentence.

2. Description of the Related Art

Dampening devices of the type subject to the present invention are those which contain a rotatable wiper in a housing having a channel (or circuit) running from a portion of the housing on or near a first side of the wiper to a portion of the housing on or near a second side of the wiper so that when the housing is filled with fluid, as the wiper is moved, it forces fluid through the channel (or circuit). Such devices are herein termed either dampeners or stabilizers with the two terms being considered synonymous with one another.

Examples of such devices are those of U.S. Pat. Nos. 4,773,514; 6,401,884; U.S. patent application Ser. Nos. 10/166,498; and 10/801,626.

Generally, some form of valve is placed within the channel (or circuit) in order to control the degree of dampening. This is usually accomplished by varying the effective cross-sectional area of the channel (or circuit).

U.S. Pat. No. 6,802,519, the application for which was filed on Sep. 9, 2002, utilizes at least two channels (or circuits) to control the degree of dampening. The first such channel (or circuit) employs the type of valve first described and claimed in U.S. patent application Ser. No. 10/166,498. In lines 39 through 41 of column 3, U.S. Pat. No. 6,802,519 explains, "The adjustment is 'progressive' in that no flow stoppage occurs between different positions of the valve." This valve 27 is shown in FIG. 5 to have a shaft with a continuous indentation cut around the shaft in such a manner that for a first area there is no cut in the shaft and then the indentation commences and becomes increasingly deeper as it progresses around the shaft until the continuous indentation stops upon reaching the first area.

The second channel and the second valve 28 are never disclosed or claimed to exist without the first channel and its valve 27. Lines 21 through 24 in column 3 of U.S. Pat. No. 6,802,519 explain, "Manual adjustment of resistance to fluid flow through a second circuit is effected by a manually manipulated progressive valve 28 positioned near a hand grip 16 on the handlebar 15."

Lines 25 through 29 of column 3 further provide, "Communication with the two sides of chamber 19 is provided by a pair of ports 29 and 31 drilled in the lower face of cover member 22 . . . These ports allow for flow of hydraulic fluid in and out of chamber 19 through each of the hydraulic circuits provided in the damper."

And lines 42 through 51 of column 3 complete the description of the second channel (or circuit) and valve 28: "A second hydraulic circuit communicating with ports 29 and 31 is provided by hoses 34 communicating with cover member 22 and progressive valve 28. The construction of valve 28 is illustrated in FIGS. 7 and 8 and comprises a thumb or finger handle 35 for turning a stem 36 having a bore 37 therethrough for selectively adjusting the resistance to fluid flow through a passage 38 in the body of valve 28 which connects the hoses 34. The stem 36 of valve 28 can be turned from closed to full open of passage 38 to reduce resistance to fluid flow and reduce dampening."

Three factors appear to the present inventor to dictate that the second circuit and the second valve 28 in the Steering Damper of U.S. Pat. No. 6,802,519 are neither disclosed nor claimed to exist apart from the first circuit and the first valve 27.

The first, and one of the two more significant factors, is that when a valve remote from the housing of the dampener is utilized to control degree of dampening, it is crucial to select a range for the internal diameter for every portion of the circuit (As utilized herein, the term "circuit" designates each and every aperture, port, channel, passage, tube, line, hose, or the like that is used in order to connect a valve to the interior chamber of the housing for a dampener and, thus, to permit fluid communication between such interior chamber and such valve.) in which the fluid flows (other than the control valve, itself) that will permit the fluid to flow freely at high speed but that will also create the fluid pressure necessary for effective dampening; but within U.S. Pat. No. 6,802,519 there is no discussion of such internal diameters.

The second factor, which is closely related to the first, is that the circuit between the housing of the dampener and the remote valve must be constructed so that it maintains its internal diameter within the crucial range discussed in the preceding paragraph, but U.S. Pat. No. 6,802,519 does not deal with this matter.

Third, the quoted description of the remote valve 28 above is a construction creating great difficulty in selecting and maintaining a desired setting other than on or off.

U.S. patent application Ser. No. 10/166,498, filed on Jun. 10, 2002, discloses a valve to be inserted into a channel (or circuit) of a dampener for controlling the degree of dampening wherein a continuous indentation is cut around a shaft in such a manner that for a first area there is no cut in the shaft and then the indentation commences and becomes increasingly deeper as it progresses around the shaft until the continuous indentation stops upon reaching the first area.

And U.S. patent application Ser. No. 10/801,626 includes a dampener which is designed for installation below the handlebars of a motorcycle, although it does not have a wiper in the housing with such wiper having a depression in its bottom to accommodate the stem nut which holds the top of the steering shaft that permits the motorcycle wheel to move left and right.

BRIEF SUMMARY OF THE INVENTION

The Fluidic Stabilizer with Remote Control of the present invention comprises a remote valve for controlling the degree of dampening of any fluidic stabilizer which employs a wiper within a housing for pushing fluid from one side of the wiper to the other side of the wiper through a circuit into which the remote valve is inserted.

The internal diameter for every portion of the circuit that is used in order to connect a valve to the interior chamber of the housing for a dampener is within a range that will permit the fluid within the circuit to flow freely at high speed but that will also create the fluid pressure necessary for effective dampening.

Moreover, the circuit between the interior chamber of the housing of the dampener and the remote valve must be constructed so that it maintains its internal diameter within the crucial range discussed in the preceding paragraph. This is preferably accomplished by utilizing tubes constructed of stainless steel braided line.

The remote valve preferably comprises an outer ring with an inner shaft rotatably mounted within the outer ring. The outer ring and the inner shaft each have a mating surface, and such mating surfaces are oriented toward each other. A first one of the mating surfaces contains a first aperture and a second aperture. A first portion of the circuit between the housing for the dampener and the remote valve communicates with the first aperture, and a second portion of the circuit between the housing for the dampener communicates with the second aperture. Otherwise, the first mating surface is smooth. The second mating surface has a continuous indentation constructed in such a manner that for a first area there is no cut in the inner shaft and then the indentation commences and becomes increasingly deeper as it progresses around the inner shaft until the continuous indentation stops upon reaching the first area. Thus, as one of the mating surfaces is rotated with respect to the other, the cross-sectional area available for the flow of fluid either increases or decreases.

The cross-sectional area of the deepest portion of the indentation may be so large as to be within the range discussed for the other components of the circuit. Most preferably, however, the maximum cross-sectional area of the indentation is below the critical range because, unlike the situation for other components of the circuit, it is often desirable for the remote valve, in addition to controlling the degree of dampening, to reduce the rate of flow of fluid and thereby to assist in maintaining adequate upstream pressure for achieving dampening.

Also, preferably, the inner shaft of the remote control valve contains a central aperture to permit the control valve to be placed around the handlebars of a motorcycle.

And a further improvement, although unrelated to the flow of fluid, is preferably having a wiper in the housing with such wiper including a depression in its bottom to accommodate the stem nut which holds the top of the steering shaft that permits the motorcycle wheel to move left and right. This allows the housing to be lower without the necessity of having the housing incorporated into the triple clamp, as is done by at least one manufacturer, RTT Motorsports of Lake Havasu City, Ariz.

DETAILED DESCRIPTION OF THE INVENTION

Figure 1:
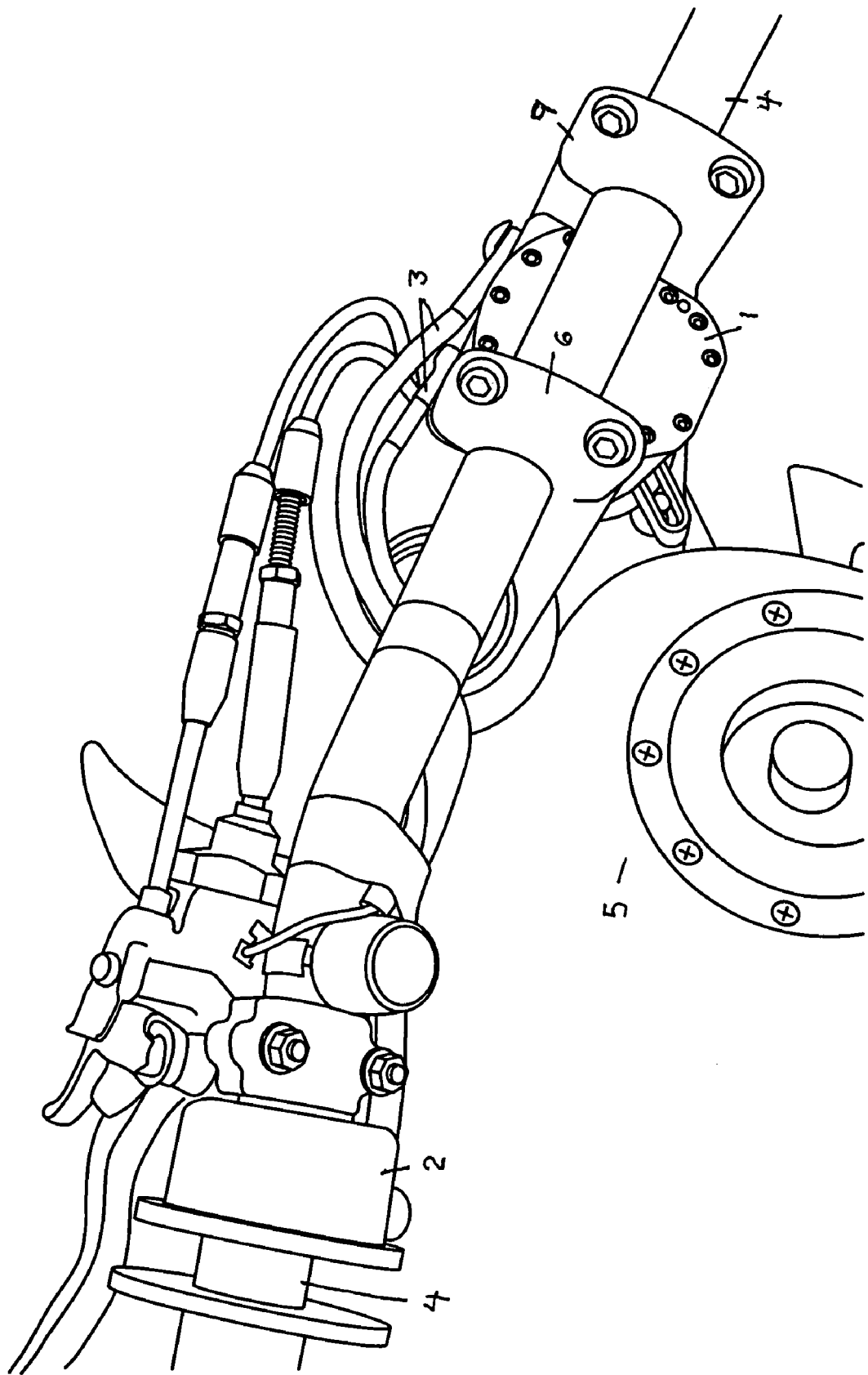
FIG. 1 is a perspective view of the Fluidic Stabilizer with Remote Control installed on a motorcycle, showing the housing under the handlebars of the motorcycle and the remote control attached to the handlebars.
Figure 2:
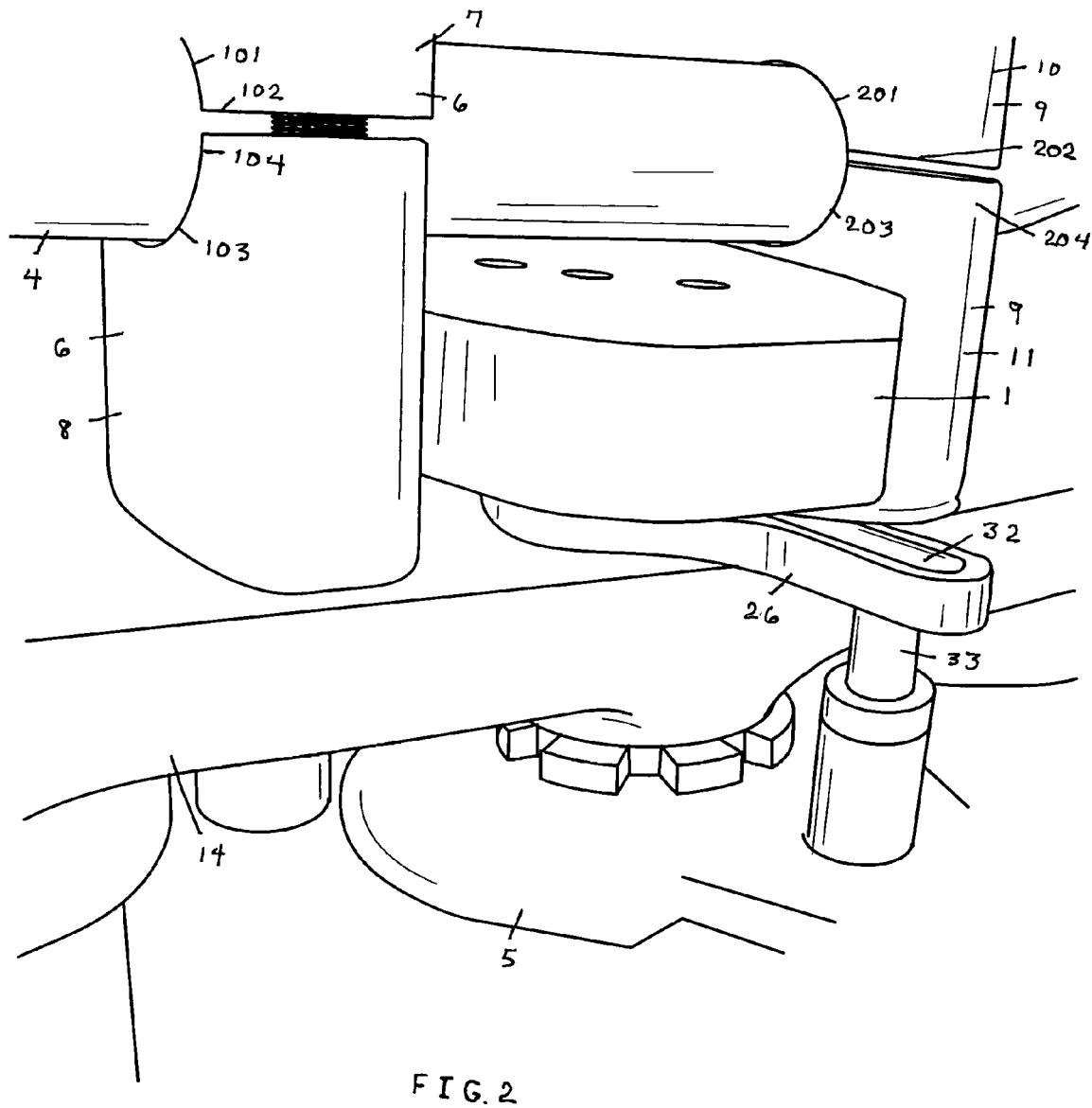
FIG. 2 presents another perspective view of the Fluidic Stabilizer with Remote Control, primarily from the rear, emphasizing the connection of the housing to the motorcycle.

As indicated above, a fluidic stabilizer generally contains a housing 1, a control valve 2, and a circuit 3. FIG. 1 and FIG. 2 illustrate these elements of the present Fluidic Stabilizer with Remote Control attached to the handlebars 4 of a motorcycle 5.

Figure 3:
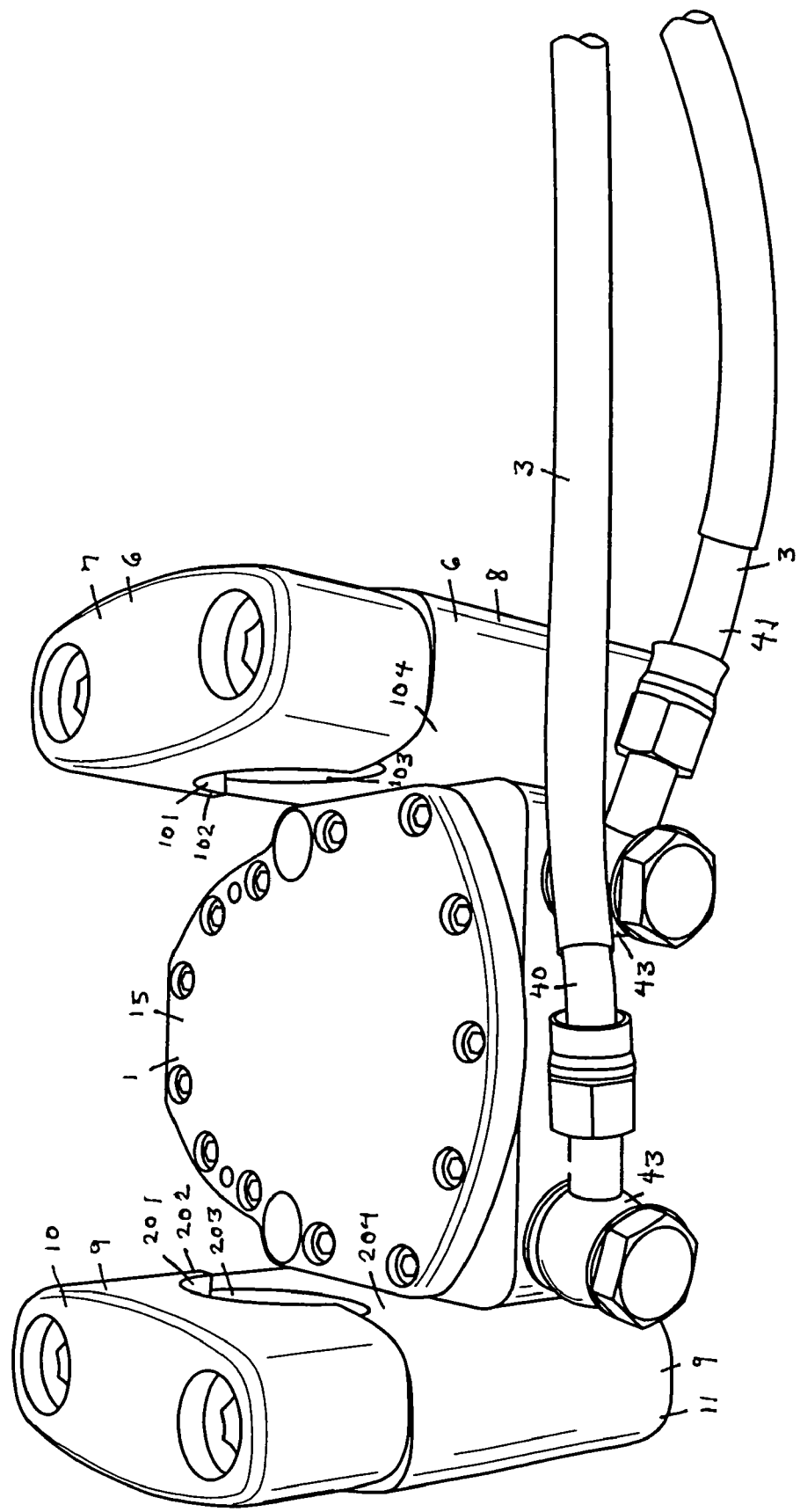
FIG. 3 constitutes a third perspective view of the Fluidic Stabilizer with Remote Control, mainly from the front, showing the housing, upper and lower attachment structure portions, and portions of the circuit connected to the housing for communication with the remote valve.

FIG. 3 provides a clearer view of a first attachment structure 6 and a second attachment structure 9. The first attachment structure 6 has an upper attachment structure portion 7, with a depression 101 in the bottom 102 of such upper attachment structure portion 7, and a lower attachment structure portion 8, with a depression 103 in the top 104 of such lower attachment structure portion 8 to adjoin substantially the depression 103 in the bottom 102 of the upper attachment structure portion 7 and thereby, when the upper attachment structure portion7 has been releasably attached to the lower attachment structure portion 8 accommodate the handlebars 4 of a motorcycle 5. Similarly, the second attachment structure 9 has an upper attachment structure portion 10, with a depression 201 in the bottom 202 of such upper attachment structure portion 10, and a lower attachment structure portion 11, with a depression 203 in the top 204 of such lower attachment structure portion 11 to adjoin substantially the depression 203 in the bottom 202 of the upper attachment structure portion 10 and thereby, when the upper attachment structure portion 10 has been releasably attached to the lower attachment structure portion 11 accommodate the handlebars 4 of a motorcycle 5.

Figure 4:
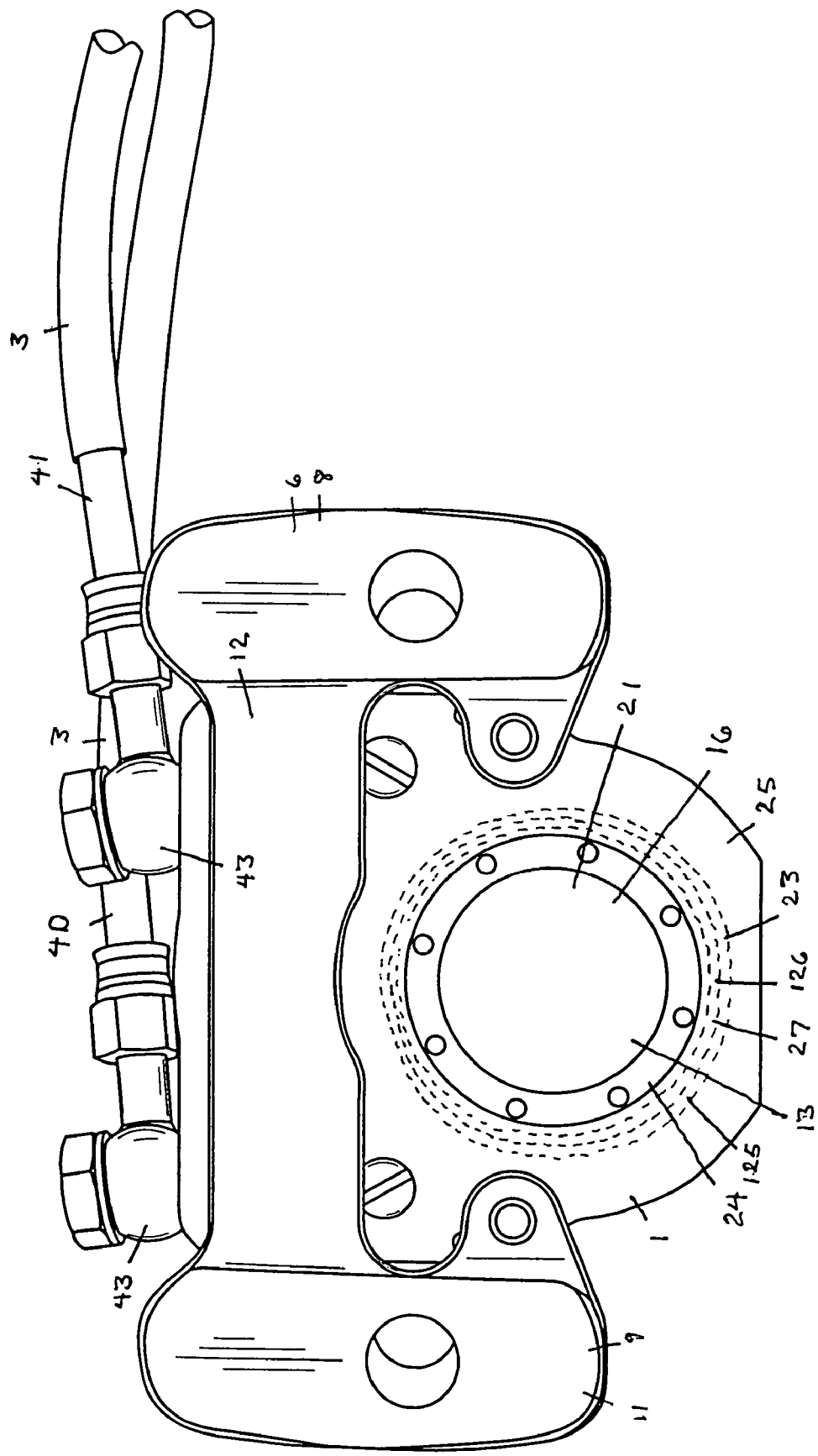
FIG. 4 shows the bottom of the housing, the bottom of the lower attachment structure, and portions of the circuit connected to the housing for communication with the remote valve.
Figure 5:
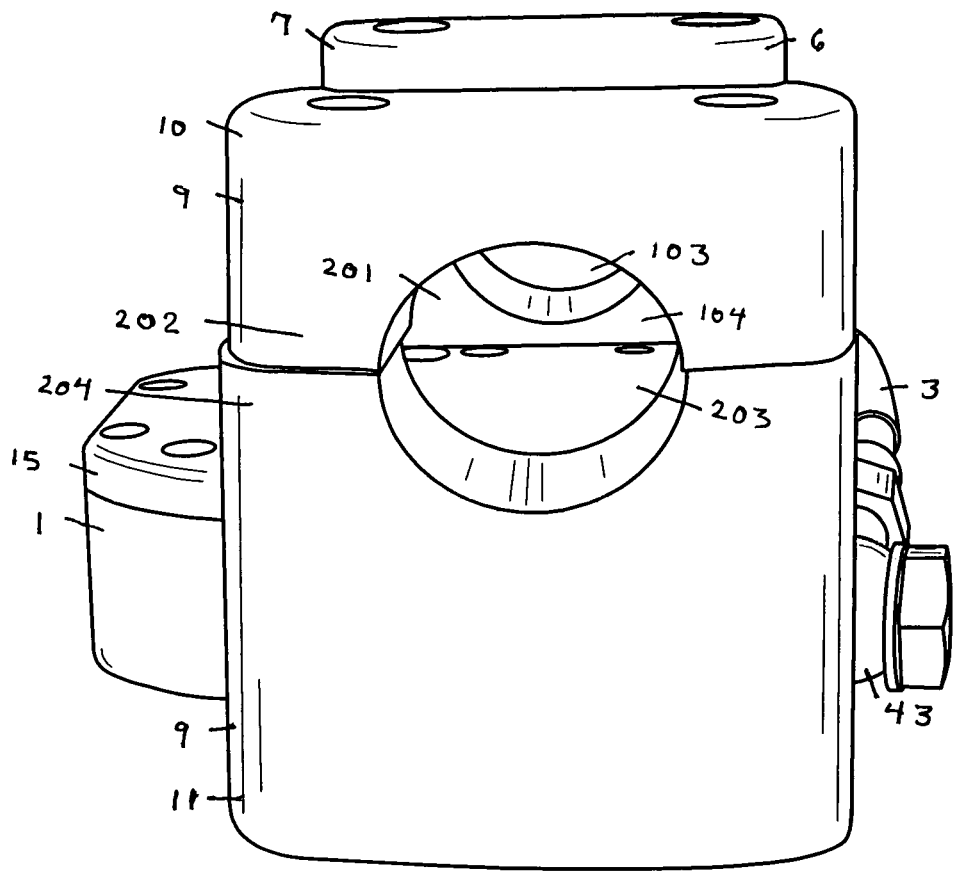
FIG. 5 portrays a lateral view, from the right, of the Fluidic Stabilizer with Remote Control, illustrating primarily the housing as well as the upper and lower attachment structures.

As seen in FIG. 4, a central segment 12 preferably joins the lower attachment structure portions 8, 11 and is preferably integrally formed with such lower attachment structure portions 8, 11; and the housing 1 is connected (preferably, removably) to the lower attachment structure portions 8, 11.

FIG. 2, FIG. 5, FIG. 6, and FIG. 7 demonstrate how the upper attachment structure portions 7, 10 can be disconnected from the lower attachment structure portions 8, 11 and then reconnected to the lower attachment structure portions 8, 11 in order to connect the attachment structures 6, 9 to the handlebars 4 of a motorcycle 5 with the housing 1 being below the handlebars 4. Preferably, the lower attachment structure portions 8, 11 are also connected (preferably, removably) to the triple clamp 14 of the motorcycle 5.

Figure 8:
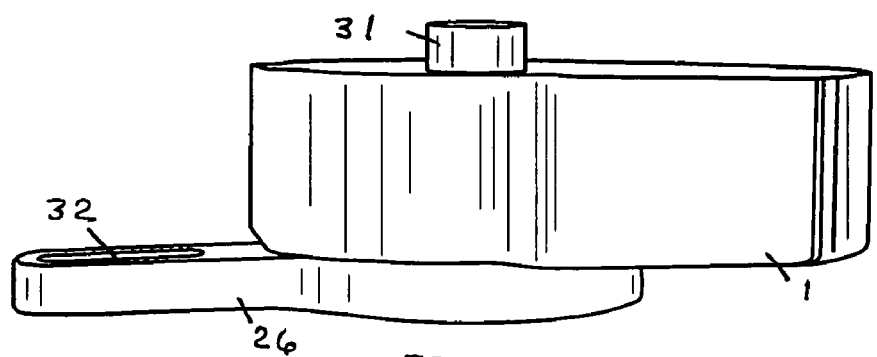
FIG. 8 provides a lateral view, from the right, of the housing with an attached arm.
Figure 9:
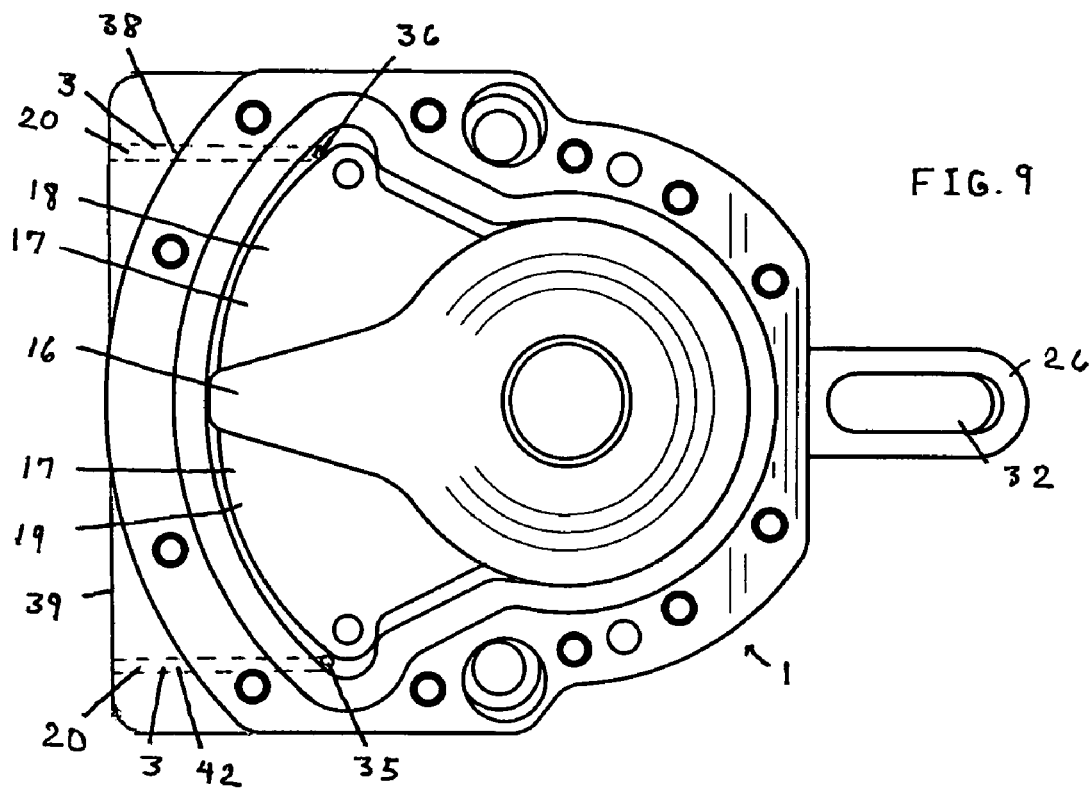
FIG. 9 gives a plan view, from above, of the interior of the housing and an attached arm.

FIG. 8 shows a side view of the housing 1 with the cover 15 for the housing 1 removed. Similarly, the housing 1, with its cover 14 removed, is shown from above in FIG. 9 revealing the rotatable wiper 16 and the interior chamber 17.

As indicated above, the housing 1 of the present Fluidic Stabilizer with Remote Control can be any housing 1 containing a rotatable wiper 16 within an interior chamber 17 of the housing 1 wherein the rotatable wiper 16 sealingly divides the interior chamber 17 into a first side 18 and a second side 19. Channels 20 are connected to the first side 18 and the second side 19 of the interior chamber 17 and, as part of the overall circuit 3, provides fluid communication between such sides 18, 19.

The embodiment shown in the present drawings is, however, a preferred embodiment.

Figure 10:
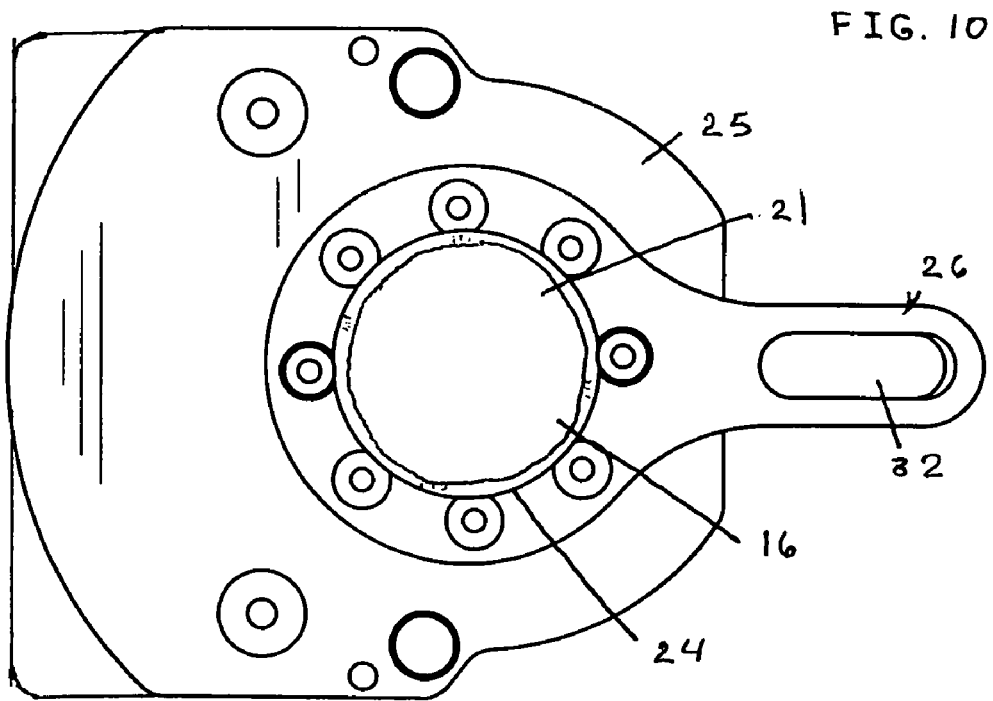
FIG. 10 is a plan view, from below, of the housing and attached arm.
Figure 12:
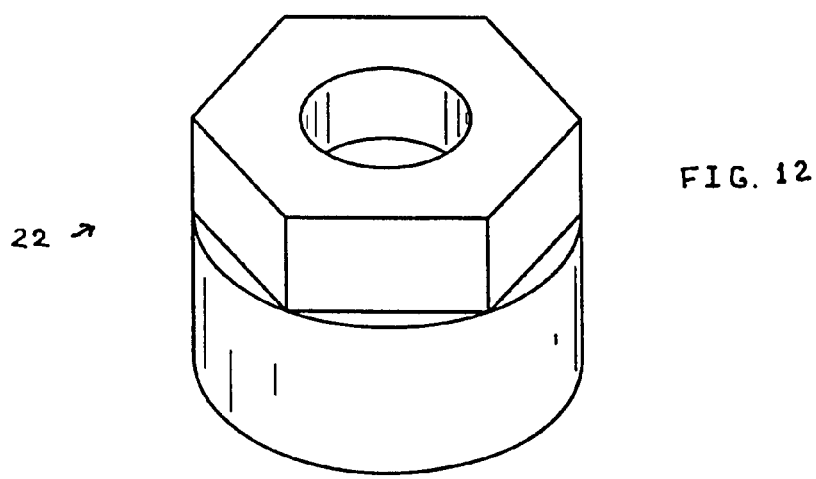
FIG. 12 is an external perspective view of the stem nut which holds the top of the steering shaft and fits within the depression that exists for the wiper in the housing of the Fluidic Stabilizer with Remote Control.
Figure 13:
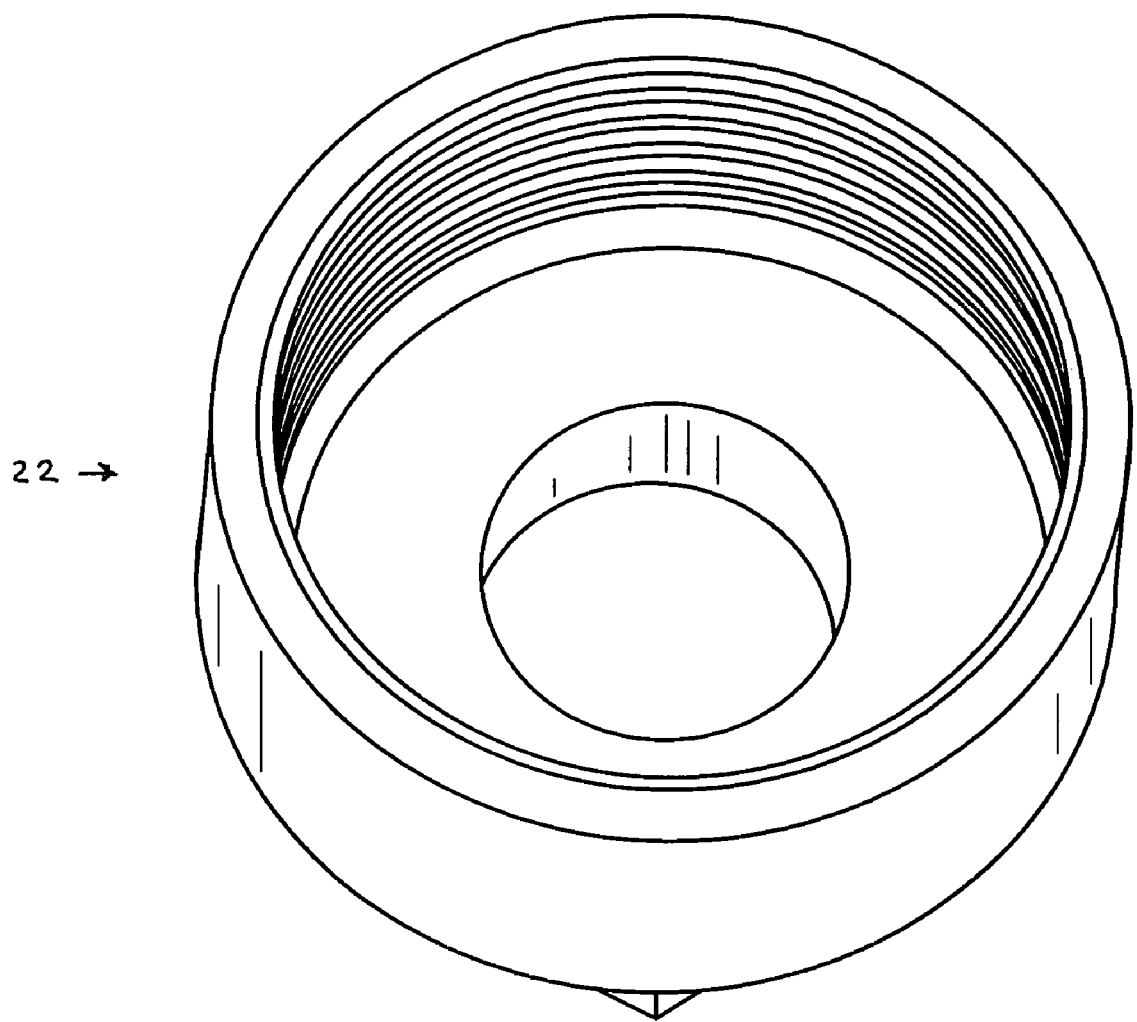
FIG. 13 provides an internal perspective view of the stem nut of FIG. 12.

In this preferred embodiment for the housing, the bottom 13 of the rotatable wiper 16 contains, as can be seen in FIG. 4 and FIG. 10 and was indicated previously, a depression 21 to accommodate the stem nut 22 which secures the top of the steering shaft for a motorcycle 5. The exterior of the preferred embodiment for the stem nut 22 is shown in FIG. 12; and the interior, in FIG. 13. The circular portion 23 of the rotatable wiper 16 extends over the aperture 24 in the bottom 25 of the housing 1 so that an arm 26 can be attached to the rotatable wiper 16 as seen in FIG. 4, FIG. 8, and FIG. 10. Also, such circular portion 23 proceeds inward beyond the aperture 24 in order to retain the rotatable wiper 16 within the housing 1. Preferably, to further preclude the possibility of fluid leaking, the lower portion 125 of the rotatable wiper 16 extending inward beyond the aperture 24 has a groove 27 to accommodate an o-ring 126.

Figure 11:
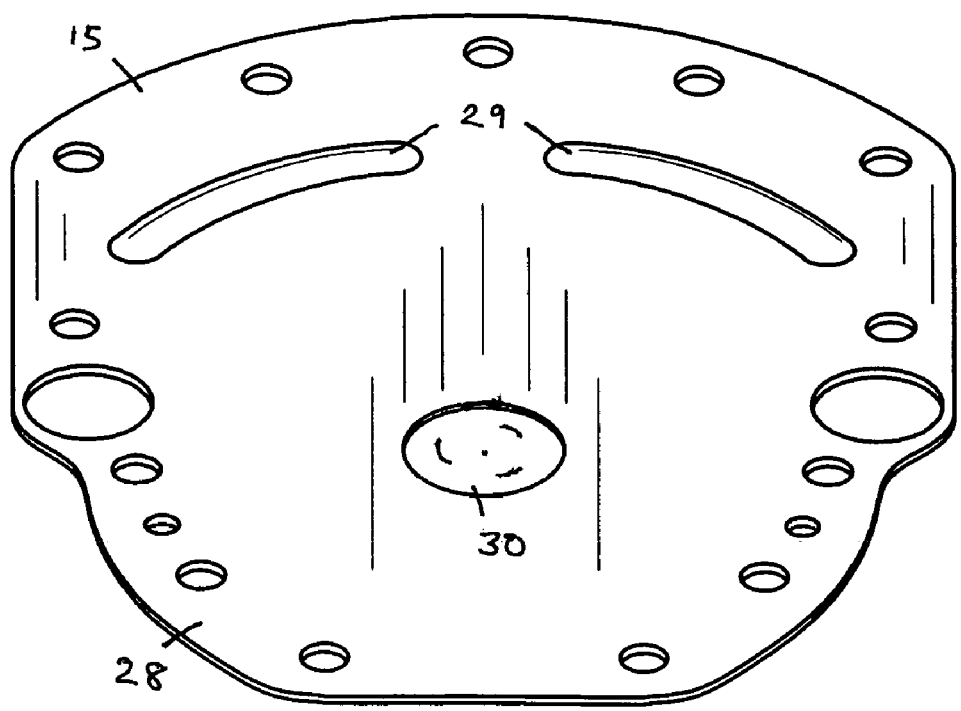
FIG. 11 exhibits a perspective view of the inside of the cover for the housing.

The inside or bottom 28 of the cover 15 for the housing 1 preferably contains, as illustrated in FIG. 11, two grooves 29 that act as sweep brakes to permit a portion of the fluid to bypass the rotatable wiper 16 and thereby reduce the degree of dampening as the rotatable wiper 16 proceeds past such grooves 29. The bottom 28 of the cover 15 also preferably contains a cavity 30 to accommodate the projecting axle 31 for the rotatable wiper 16 and thereby stabilize the rotation of the wiper 16.

As seen in FIG. 2, the arm 26 has an aperture 32 to retain a pin 33 attached to the body 34 of the motorcycle 5 and thereby maintain the rotatable wiper 16 in longitudinal alignment with the motorcycle 5 while the housing 1 turns with the handlebars 4 of the motorcycle thereby, when the motorcycle 5 is turned to the left, forcing fluid through aperture 35 from the second side 19 of the interior chamber 17, into the circuit 3, and ultimately through aperture 36 into the first side 18 of the interior chamber 17. Of course, when the motorcycle 5 is turned to the right, the flow of fluid proceeds in the opposite direction.

The degree of dampening is, as explained above, generally controlled by a valve 2 placed within the circuit 3.

Although most stablilizers have, in the past, had their circuit 3 and valve 2 contained within the housing 1, it is advantageous to have a remote control valve 2, especially when such remote control valve 2 is located on the handlebars 4 of the motorcycle 5 since an operator's hand will already be near such remote control valve 2 when the motorcycle 5 is being operated.

The circuit 3 of the present invention, when the preferred embodiment for the housing 1 is utilized, comprises aperture 36, a first housing channel 38 communicating with aperture 36 and running to the exterior 39 of the housing 1, a first tube 40 connected to and communicating with the first housing channel 38, the remote control valve 2 communicating with and connected to the first tube 40, a second tube 41 communicating with and connected to the remote control valve 2, a second housing channel 42 communicating with and connected to the second tube, and aperture 35 communicating with and connected to the second housing channel 42.

Figure 14:
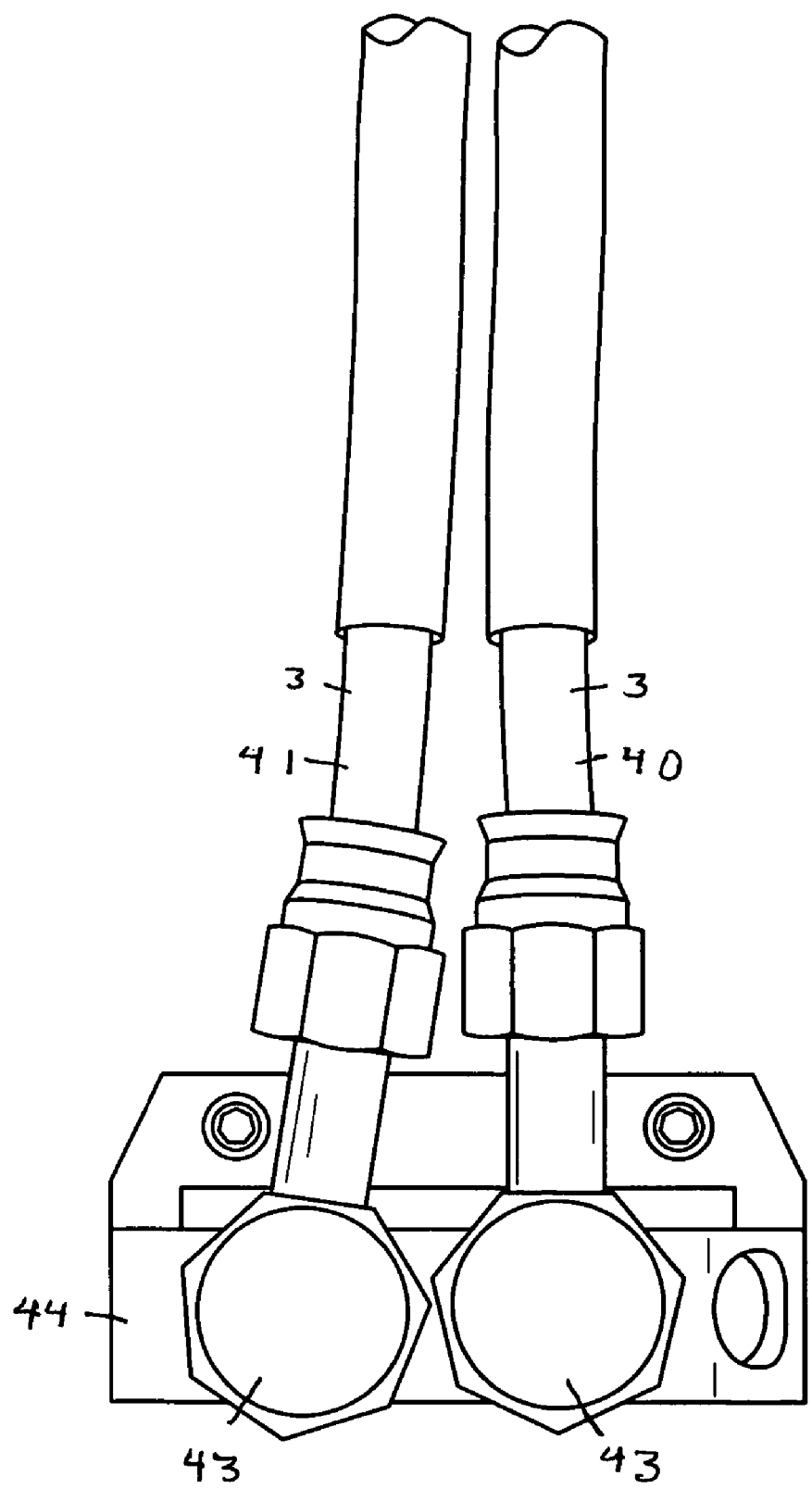
FIG. 14 exhibits a plan view, from below, of the remote control valve with portions of the circuit connected to the remote control valve for communication with the interior chamber of the housing.
Figure 15:
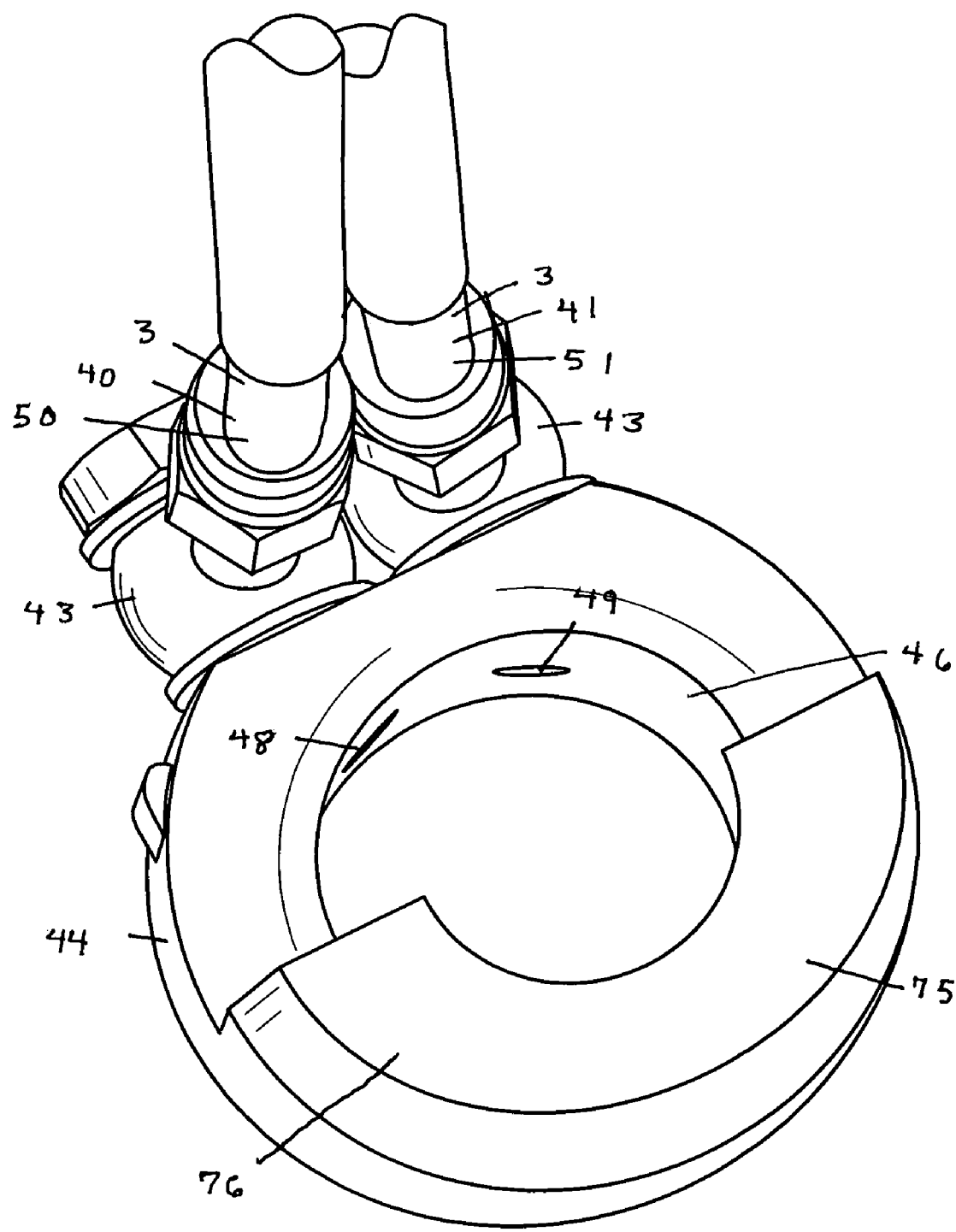
FIG. 15 portrays a perspective view showing the mating surface of the outer ring with the apertures in the outer ring for communicating with the interior chamber of the housing.

Connections between elements of the circuit 3 outside the housing 1 are preferable accomplished with fittings 43. FIG. 14 and FIG. 15, for example shows the connections between the first tube 40 and the remote control valve 2 as well as those between the remote control valve 2 and the second tube 41.

For the present invention, any type of valve 2 which controls the degree of dampening by varying the cross-sectional area of the circuit 3 will suffice. The valve can operate either with discrete or continuous movement, and a valve having discrete movement can either (other than in the closed position) preclude or allow fluid flow between discrete positions.

Although the construction of a particularly preferred embodiment for the valve 2 will be discussed subsequently, one of the two most critical aspects for the present invention is that the internal diameter for every portion of the circuit 3 must be within a range that will permit the fluid to flow freely at high speed but that will also create the fluid pressure necessary for effective damping.

This range will vary depending on the viscosity of the fluid. For example, for oil having a fluid viscosity of 2 wt., the range for the internal diameter is 0.084 inch to 0.094 inch, inclusive of the end points for the range; for oil having a fluid viscosity of 5 wt., 0.094 inch to 0.104 inch, inclusive of the end points for the range; and for oil having a fluid viscosity of 10 wt., 0.104 inch to 0.125 inch, inclusive of the end points for the range.

The maximum cross-sectional area for the fluid pathway in the remote control valve 2 should be no larger than the maximum elsewhere in the circuit 3 but is preferably less.

The other major critical aspect of the present invention is, again as observed above, that the circuit 3 must be constructed to maintain its internal diameter within the crucial range discussed above. Preferably, this is achieved by using channels 38, 42 within the housing 1 and tubes 40, 41 constructed of stainless steel braided line outside the housing 1.

The construction for the preferred embodiment of the remote control valve 2 is portrayed in FIGS. 14, 15, 16, 17, 18, 19, and 20.

Figure 21:
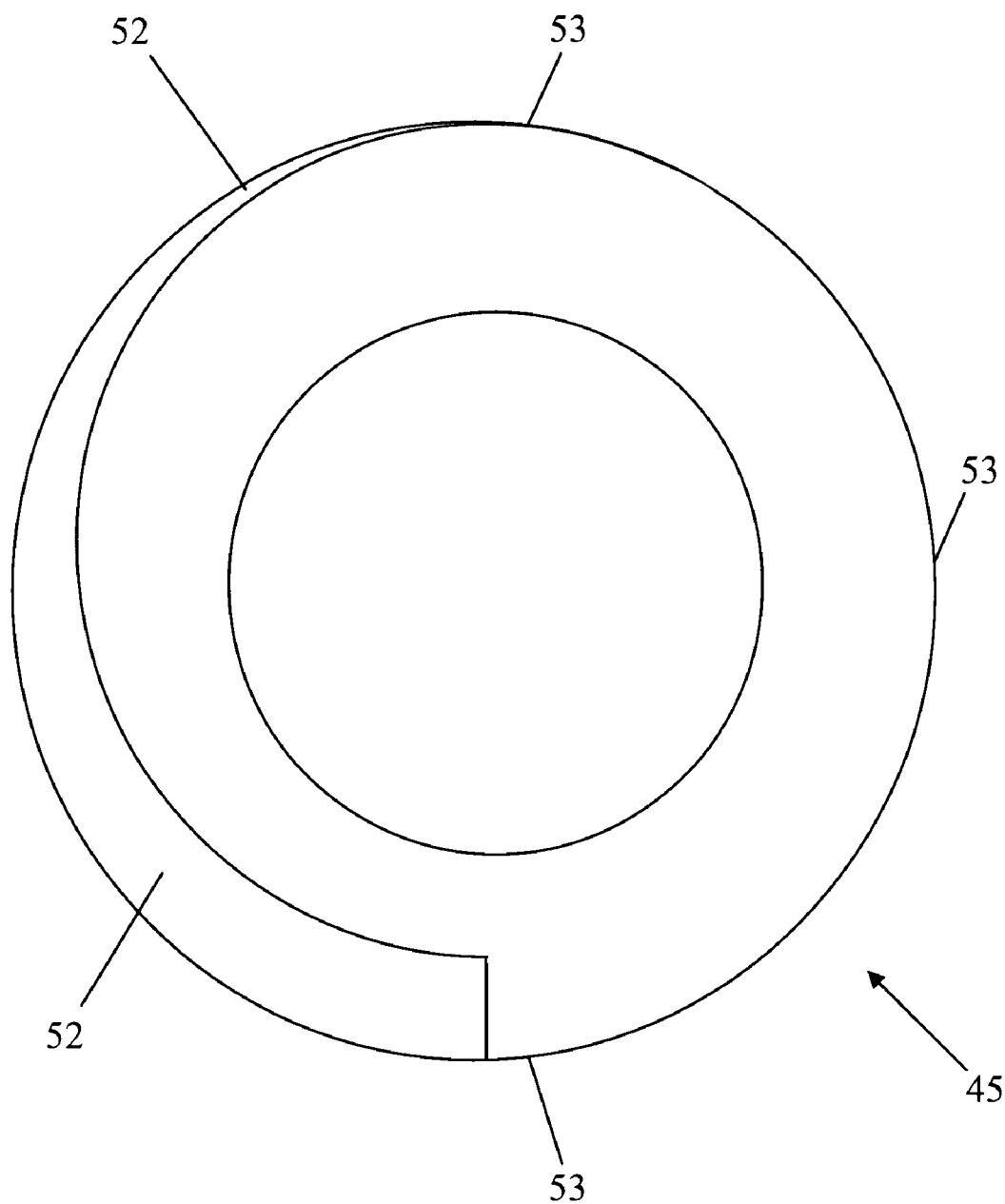
FIG. 21 is a transverse cross-sectional view of the inner shaft taken on the line 1-1 of FIG. 16.

As discussed above, the remote valve 2 preferably comprises an outer ring 44 with an inner shaft 45 rotatably mounted within the outer ring 44. The outer ring 44 has a mating surface 46, and the inner shaft 45 also has a mating surface 47. The mating surfaces 46, 47 are oriented toward each other. A first one of the mating surfaces 46 contains, as illustrated in FIG. 15, a first aperture 48 and a second aperture 49. (For explanatory purposes the mating surface 46 of the outer ring 44 has been selected to contain the apertures 48, 49; but such apertures could equally well be contained in the mating surface 47 of the inner shaft 45.) A first portion 50 of the circuit 3 between the housing 1 and the remote valve 2 communicates with the first aperture 48, and a second portion 51 of the circuit 3 between the housing 1 communicates with the second aperture 49. Otherwise, the first mating surface 46 is smooth. The second mating surface 47 has, as portrayed in FIGS. 16 and 21, a continuous indentation 52 (Of course, the continuous indentation 52 would be in the first mating surface 46 if the apertures 48, 49 were in the second mating surface 47.) constructed in such a manner that for a first area 53 there is no intrusion into the inner shaft 45 and then the continuous indentation 52 commences and becomes increasingly deeper as it progresses (preferably, for approximately 120 degrees) around the inner shaft 45 until the continuous indentation 52 stops (either abruptly or gradually, but preferably abruptly) upon reaching the first area 53. Thus, as one of the mating surfaces 47 is rotated with respect to the other 46 (Preferably, the mating surface 47, in the exemplary embodiment now being considered, that is rotated is the mating surface 47 containing the continuous indentation 52.), the cross-sectional area available for the flow of fluid either increases or decreases.

Figure 16:
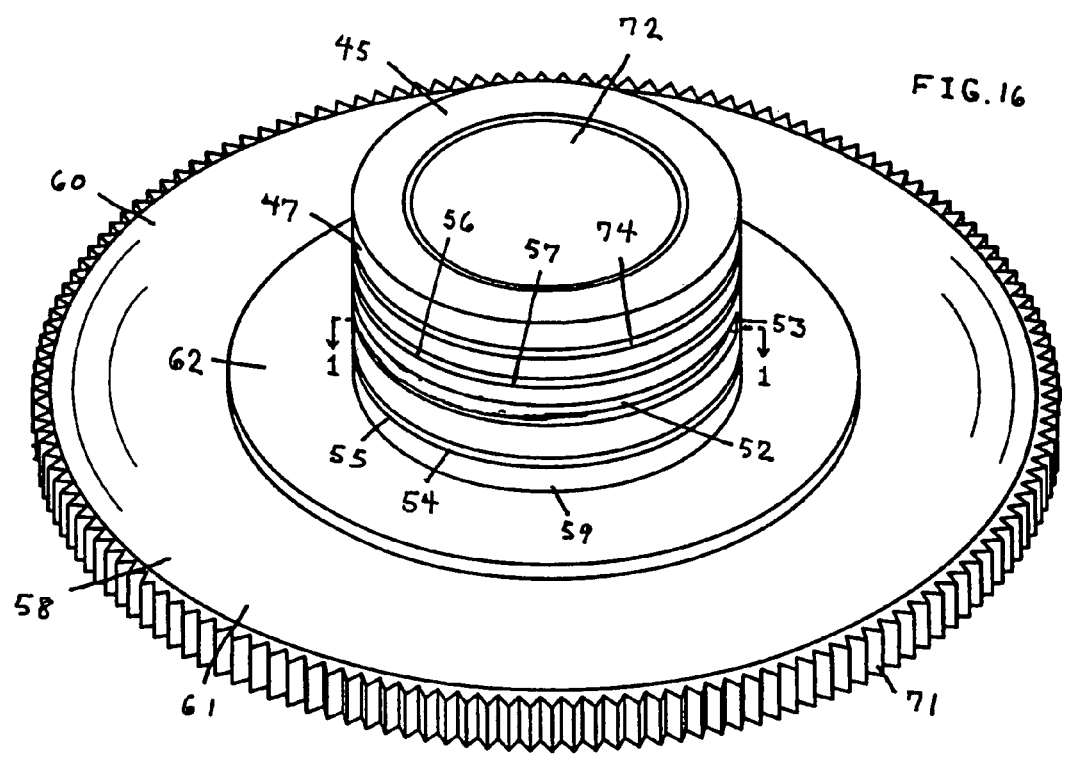
FIG. 16 provides a perspective view of the inner shaft, having a mating surface for working in conjunction with the mating surface of the outer ring, for the remote control valve with an attached disk-shaped handle for controlling the degree to which the valve is open or closed.

In order further to assure that fluid does not leak from the remote control valve 2, a lower groove 54, which is below the continuous indentation 52 as shown in FIG. 16 for the illustrative embodiment, contains an o-ring 55; and an upper groove 56, which is above the continuous indentation 52 as portrayed in FIG. 16 for the illustrative embodiment, contains an o-ring 57.

Figure 17:
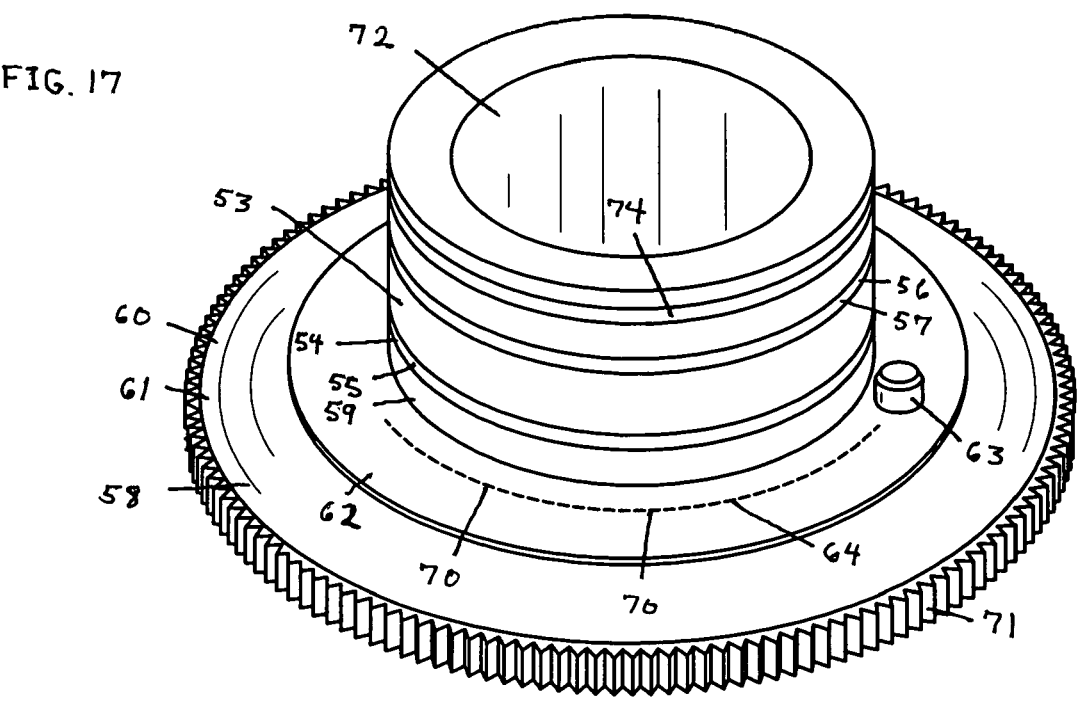
FIG. 17 gives a perspective view from the other side of the inner shaft, showing a projection that works with a groove in a first lateral surface of the external ring to restrict the degree to which the disk-shaped handle can be turned and additionally illustrating a series of discrete minor indentations in a portion of an interior lateral surface of the disk-shaped handle that function, in conjunction with a spring and ball mounted within a cavity extending from the first lateral surface of the external ring into the external ring, to create a series of discrete temporary stopping positions for rotation of the disk-shaped handle.
Figure 6:
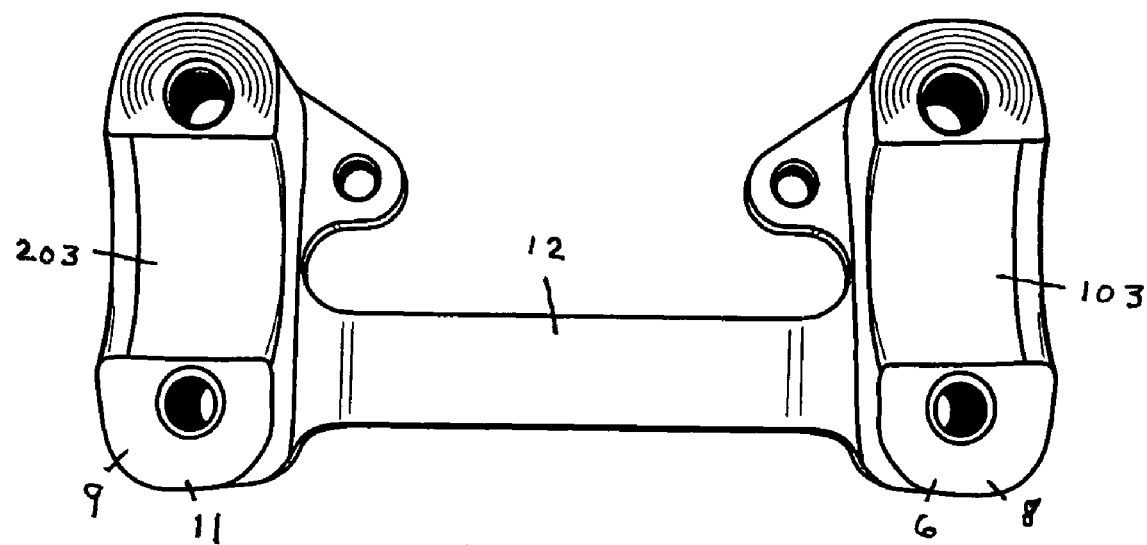
FIG. 6 is a plan view, from above, of the lower attachment structure.
Figure 7:
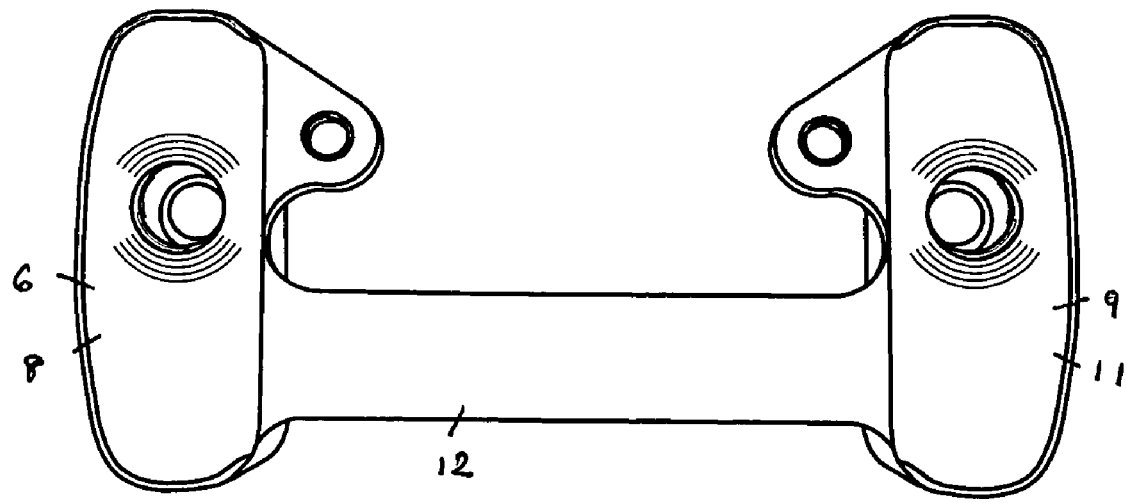
FIG. 7 gives a plan view, from below, of the lower attachment structure.

As seen in FIG. 16 and FIG. 17, a disk-shaped handle 58 is attached to the inner shaft 45, preferably near a first end 59 of the inner shaft 45. On a first side 60 the disk-shaped handle 58 preferably has a first interior lateral surface 61 and a higher second interior lateral surface 62. As shown in FIG. 17 for the illustrative embodiment, projection 63 extends upward from the second interior lateral surface 62, and a series of discrete minor indentations 64 are located on the second interior lateral surface 62.

Figure 18:
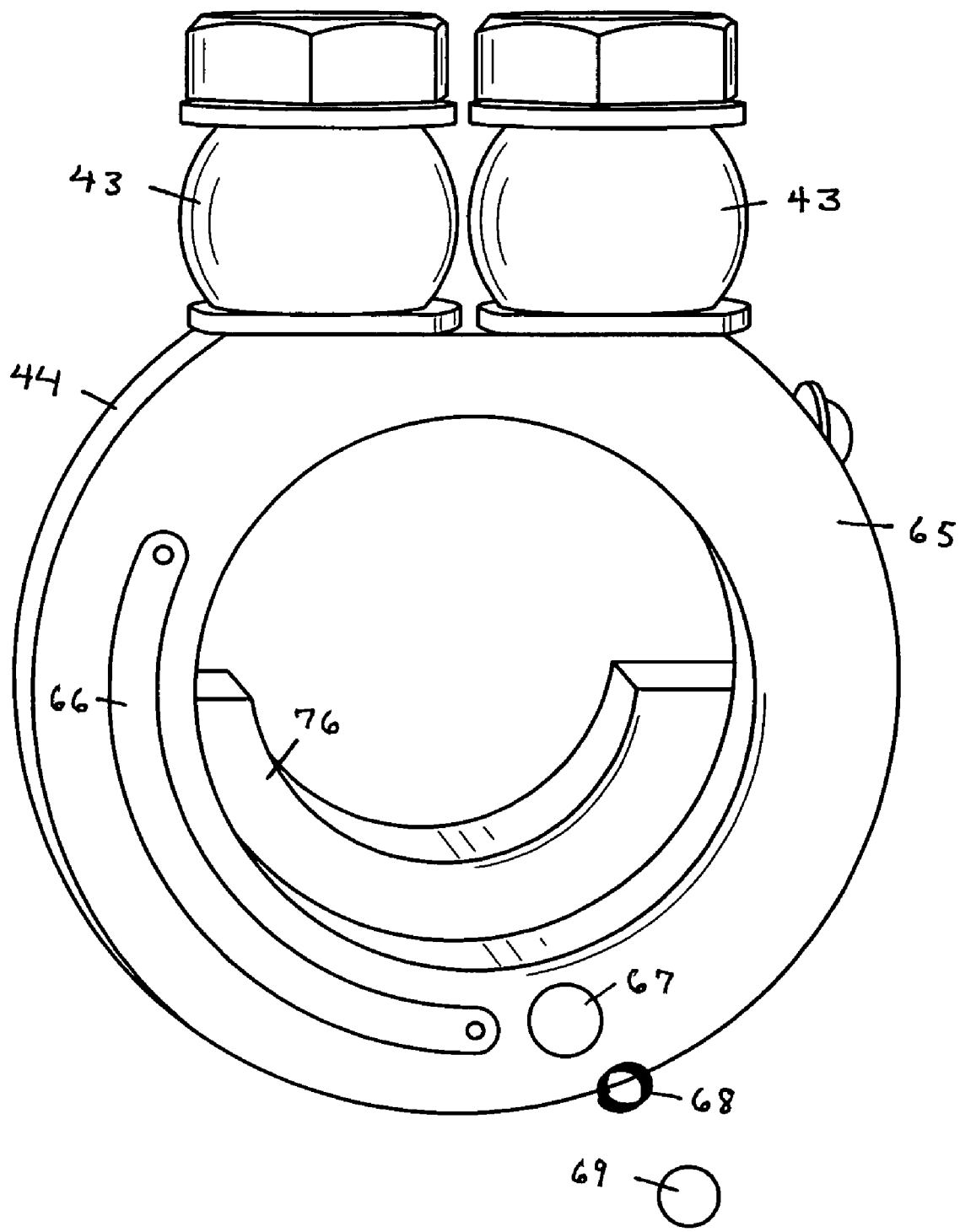
FIG. 18 is a perspective view of a first outward lateral surface for the outer ring, portraying the groove and the cavity in such first outward lateral surface as well as the spring and ball which are inserted into the cavity.

A first outward lateral surface 65 of the outer ring 44 contains, as depicted in FIG. 18 for the illustrative embodiment, a groove 66 which preferably extends for approximately ninety degrees and which accommodates the projection 63 in order to restrict the rotation of the disk-shaped handle 58. The first outward lateral surface 65 of the outer ring 44 also has a cavity 67 in which a spring 68 is placed below a ball 69.

The inner shaft 45 is placed within the outer ring 44 with the first outward lateral surface 65 of the outer ring 44 oriented toward the first and second interior lateral surfaces 61, 62 of the disk-shaped handle 58 so that the projection 63 fits within the groove 66 and that the spring 68 will urge the ball 69 against the series of discrete minor indentations 64 in order to create a series of discrete temporary stopping positions 70 for rotation of the disk-shaped handle 58.

Although a preferred illustrative embodiment has been shown and discussed, both the groove 66 and the spring 68 and ball 69 can be on either the first outward lateral surface 65 of the outer ring 44 or on either of the first and second interior lateral surfaces 61, 62 of the disk-shaped handle 58. Similarly, the projection 63 and the series of discrete minor indentations 64 can each either be on the first side 60 of the disk-shaped handle 58 or on the first outward lateral surface 65 of the outer ring 44.

Preferably, a friction-enhancing surface 71 exists on the edge of the disk-shaped handle 58.

And also preferably, as illustrated in FIG. 17 and FIG. 18, the center 72 of the inner shaft 45 is hollow so that the remote control valve 2 can be place around the handlebars 4 of a motorcycle 5, as shown in FIG. 1.

Figure 19:
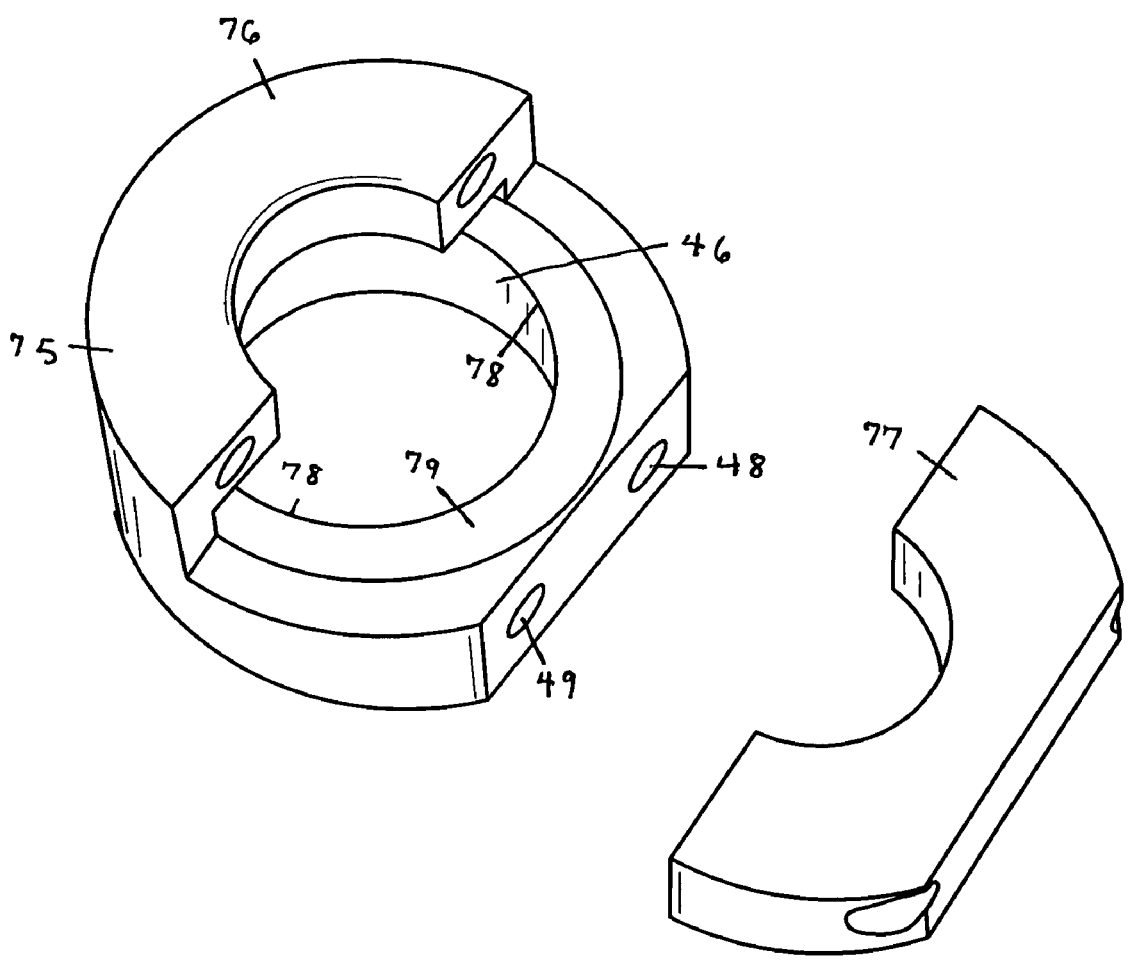
FIG. 19 shows a perspective view of a second outward lateral surface for the outer ring as well as an upper locking segment and a lower, removable locking segment of the outer ring which are connected together in order to cooperate with a C clip and thereby retain the inner shaft within the outer ring.
Figure 20:
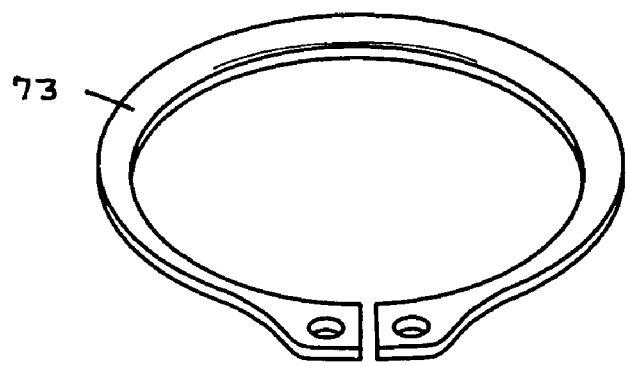
FIG. 20 is a perspective view of the C clip.

Finally, a preferred mechanism for retaining the inner shaft 45 within the outer ring 44 comprises placing a C clip 73 such as that shown in FIG. 20 within an uppermost groove 74. To facilitate such placement, the inward end 75 of the outer ring 44 comprises, as depicted in FIG. 19, an upper locking segment 76 and a lower, removable locking segment 77. When the inner shaft 45 has been inserted within the outer ring 44, the clip 73 extends from the uppermost groove 74 beyond the lower edge 78 of the second lateral surface 79 of the outer ring 44, thereby precluding removal of the inner shaft 45 from the outer ring 44.

Any fluid that is known in the art for use in steering dampeners may be utilized in the present invention. This includes, but is not necessarily limited to, motor oil and transmission fluid.

Herein the discussion regarding the size of an internal diameter is utilized since most circuits 3 are round. This is a matter of convenience, and it is intended to indicate that the internal cross-sectional area of the circuit 3, which may be of any shape but is preferably circular, will be equal to that of a circle having the stated diameter.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

I claim:

1. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range that will permit fluid placed in the circuit to flow freely at high speed but that will also create the fluid pressure necessary for effective damping; and one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

2. The improved fluidic stabilizer as recited in claim 1, wherein:

the center of said inner shaft is hollow.

3. The improved fluidic stabilizer as recited in claim 1, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

4. The improved fluidic stabilizer as recited in claim 3, wherein:

the center of said inner shaft is hollow.

5. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range that will permit fluid placed in the circuit to flow freely at high speed but that will also create the fluid pressure necessary for effective damping; and one or more tubes constructed of stainless steel braided line comprising every portion of the circuit that is outside the housing, wherein:

the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

6. The improved fluidic stabilizer as recited in claim 5, wherein:

the center of said inner shaft is hollow.

7. The improved fluidic stabilizer as recited in claim 5, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

8. The improved fluidic stabilizer as recited in claim 7, wherein:

the center of said inner shaft is hollow.

9. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range that will permit fluid placed in the circuit to flow freely at high speed but that will also create the fluid pressure necessary for effective damping; and a means for maintaining the cross-sectional area for every portion of the circuit within such range, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

10. The improved fluidic stabilizer as recited in claim 9, wherein:

the center of said inner shaft is hollow.

11. The improved fluidic stabilizer as recited in claim 9, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

12. The improved fluidic stabilizer as recited in claim 11, wherein:

the center of said inner shaft is hollow.

13. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range that will permit fluid placed in the circuit to flow freely at high speed but that will also create the fluid pressure necessary for effective damping; and a means for maintaining the cross-sectional area for every portion of the circuit within such range, wherein:

the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

14. The improved fluidic stabilizer as recited in claim 13, wherein:

the center of said inner shaft is hollow.

15. The improved fluidic stabilizer as recited in claim 13, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

16. The improved fluidic stabilizer as recited in claim 15, wherein:

the center of said inner shaft is hollow.

17. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.084 inch to 0.094 inch. inclusive of the end points for the range; and one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

18. The improved fluidic stabilizer as recited in claim 17, wherein:
the center of said inner shaft is hollow.

19. The improved fluidic stabilizer as recited in claim 17, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

20. The improved fluidic stabilizer as recited in claim 19, wherein:
the center of said inner shaft is hollow.

21. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.084 inch to 0.094 inch, inclusive of the end points for the range; and one or more tubes constructed of stainless steel braided line comprising every portion of the circuit that is outside the housing, wherein:

the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

22. The improved fluidic stabilizer as recited in claim 21, wherein:

the center of said inner shaft is hollow.

23. The improved fluidic stabilizer as recited in claim 21, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

24. The improved fluidic stabilizer as recited in claim 23, wherein:

the center of said inner shaft is hollow.

25. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.084 inch to 0.094 inch, inclusive of the end points for the range; and a means for maintaining the cross-sectional area for every portion of the circuit within such range, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

26. The improved fluidic stabilizer as recited in claim 25, wherein:

the center of said inner shaft is hollow.

27. The improved fluidic stabilizer as recited in claim 25, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

28. The improved fluidic stabilizer as recited in claim 27, wherein:
the center of said inner shaft is hollow.

29. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:
having the internal cross-sectional area for every portion of the circuit within a range equivalent to the area of a circular cross section having a diameter of 0.084 inch to 0.094 inch, inclusive of the end points for the range; and
a means for maintaining the cross-sectional area for every portion of the circuit within such range, wherein:
the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;
an o-ring placed in the lower groove of said inner shaft;
another o-ring placed in the upper groove of said inner shaft;
a disk-shaped handle attached to said inner shaft, said disk-shaped handle having a first side containing a series of discrete minor indentations located so as to have said ball urged against such minor indentations by said spring;
a projection attached to and extending upward from the first side of said disk-shaped handle located so as to fit within the groove of said outer ring; and
a means for retaining said inner shaft within said outer ring.

30. The improved fluidic stabilizer as recited in claim 29, wherein:
the center of said inner shaft is hollow.

31. The improved fluidic stabilizer as recited in claim 29, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

32. The improved fluidic stabilizer as recited in claim 31, wherein:

the center of said inner shaft is hollow.

33. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.094 inch to 0.104 inch, inclusive of the end points for the range; and one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

34. The improved fluidic stabilizer as recited in claim 33, wherein:

the center of said inner shaft is hollow.

35. The improved fluidic stabilizer as recited in claim 33, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

36. The improved fluidic stabilizer as recited in claim 35, wherein:
the center of said inner shaft is hollow.

37. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:
having the internal cross-sectional area for every portion of the circuit within a range equivalent to the area of a circular cross section having a diameter of 0.094 inch to 0.104 inch, inclusive of the end points for the range; and
one or more tubes constructed of stainless steel braided line comprising every portion of the circuit that is outside the housing, wherein:
the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;
an o-ring placed in the lower groove of said inner shaft;
another o-ring placed in the upper groove of said inner shaft;
a disk-shaped handle attached to said inner shaft, said disk-shaped handle having a first side containing a series of discrete minor indentations located so as to have said ball urged against such minor indentations by said spring;
a projection attached to and extending upward from the first side of said disk-shaped handle located so as to fit within the groove of said outer ring; and
a means for retaining said inner shaft within said outer ring.

38. The improved fluidic stabilizer as recited in claim 37, wherein:
the center of said inner shaft is hollow.

39. The improved fluidic stabilizer as recited in claim 37, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

40. The improved fluidic stabilizer as recited in claim 39, wherein:
the center of said inner shaft is hollow.

41. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.094 inch to 0.104 inch, inclusive of the end points for the range; and a means for maintaining the cross-sectional area for every portion of the circuit within such range, wherein:

the bottom of the rotatable wiper has a depression exposed to the outside of the housing through an aperture in said housing, with the depression constructed of such dimensions as to accommodate a stem nut at the top of a steering shaft; and the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

42. The improved fluidic stabilizer as recited in claim 41, wherein:

the center of said inner shaft is hollow.

43. The improved fluidic stabilizer as recited in claim 41, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

44. The improved fluidic stabilizer as recited in claim 43, wherein:

the center of said inner shaft is hollow.

45. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.094 inch to 0.104 inch, inclusive of the end points for the range; and
a means for maintaining the cross-sectional area for every portion of the circuit within such range, wherein:
the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;
an o-ring placed in the lower groove of said inner shaft;
another o-ring placed in the upper groove of said inner shaft;
a disk-shaped handle attached to said inner shaft, said disk-shaped handle having a first side containing a series of discrete minor indentations located so as to have said ball urged against such minor indentations by said spring;
a projection attached to and extending upward from the first side of said disk-shaped handle located so as to fit within the groove of said outer ring; and
a means for retaining said inner shaft within said outer ring.

46. The improved fluidic stabilizer as recited in claim 45, wherein:
the center of said inner shaft is hollow.

47. The improved fluidic stabilizer as recited in claim 45, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

48. The improved fluidic stabilizer as recited in claim 47, wherein:
the center of said inner shaft is hollow.

49. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:
having the internal cross-sectional area for every portion of the circuit within a range equivalent to the area of a circular cross section having a diameter of 0.104 inch to 0.125 inch, inclusive of the end points for the range; and
one or more tubes constructed of stainless steel braided line comprising every portion of the circuit that is outside the housing, wherein:
the bottom of the rotatable wiper has a depression exposed to the outside of the housing through an aperture in said housing, with the depression constructed of such dimensions as to accommodate a stem nut at the top of a steering shaft; and
the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;
an o-ring placed in the lower groove of said inner shaft;
another o-ring placed in the upper groove of said inner shaft;
a disk-shaped handle attached to said inner shaft, said disk-shaped handle having a first side containing a series of discrete minor indentations located so as to have said ball urged against such minor indentations by said spring;
a projection attached to and extending upward from the first side of said disk-shaped handle located so as to fit within the groove of said outer ring; and
a means for retaining said inner shaft within said outer ring.

50. The improved fluidic stabilizer as recited in claim 49, wherein:
the center of said inner shaft is hollow.

51. The improved fluidic stabilizer as recited in claim 49, further comprising:
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

52. The improved fluidic stabilizer as recited in claim 51, wherein:
the center of said inner shaft is hollow.

53. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:
having the internal cross-sectional area for every portion of the circuit is within a range equivalent to the area of a circular cross section having a diameter of 0.104 inch to 0.125 inch, inclusive of the end points for the range; and
one or more tubes constructed of stainless steel braided line comprising every portion of the circuit that is outside the housing, wherein:
the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

54. The improved fluidic stabilizer as recited in claim 53, wherein:

the center of said inner shaft is hollow.

55. The improved fluidic stabilizer as recited in claim 53, further comprising:

a first attachment structure, which comprises:
   an upper attachment structure portion having a bottom with a depression in the bottom of said upper attachment structure portion; and
   a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:
   an upper attachment structure portion having a bottom with a depression in the bottom of said upper attachment structure portion; and
   a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:
   the housing is connected to the lower attachment structure portion of said first attachment structure and to the lower attachment structure portion of said second attachment structure.

56. The improved fluidic stabilizer as recited in claim 55, wherein:

the center of said inner shaft is hollow.

57. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.104 inch to 0.125 inch, inclusive of the end points for the range; and a means for maintaining the cross-sectional area for every portion of the circuit within such range, wherein:
   the bottom of the rotatable wiper has a depression exposed to the outside of the housing through an aperture in said housing, with the depression constructed of such dimensions as to accommodate a stem nut at the top of a steering shaft; and
   the remote control valve comprises:
   an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
      an upper locking segment; and
      a lower, removable locking segment;
   a spring placed in the cavity of said outer ring;
   a ball placed in the cavity of said outer ring so that said spring can urge a portion of said ball beyond the cavity of said outer ring;
   an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;
   an o-ring placed in the lower groove of said inner shaft;
   another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

58. The improved fluidic stabilizer as recited in claim 57, wherein:

the center of said inner shaft is hollow.

59. The improved fluidic stabilizer as recited in claim 57, further comprising:

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

60. The improved fluidic stabilizer as recited in claim 59, wherein:

the center of said inner shaft is hollow.

61. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit is within a range equivalent to the area of a circular cross section having a diameter of 0.104 inch to 0.125 inch, inclusive of the end points for the range; and a means for maintaining the cross-sectional area for every portion of the circuit within such range, wherein:

the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring.

62. The improved fluidic stabilizer as recited in claim 61, wherein:

the center of said inner shaft is hollow.

63. The improved fluidic stabilizer as recited in claim 61, further comprising:
   a first attachment structure, which comprises:
      an upper attachment structure portion having a bottom with a depression in the bottom of said upper attachment structure portion; and
      a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
   a second attachment structure, which comprises:
      an upper attachment structure portion having a bottom with a depression in the bottom of said upper attachment structure portion; and
      a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
   a central segment joining the lower attachment structure portion of said first attachment structure to the lower attachment structure portion of said second attachment structure; and wherein:
      the housing is connected to the lower attachment structure portion of said first attachment structure and to the lower attachment structure portion of said second attachment structure.

64. The improved fluidic stabilizer as recited in claim 63, wherein:
   the center of said inner shaft is hollow.

65. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:
   having the internal cross-sectional area for every portion of the circuit within a range that will permit fluid placed in the circuit to flow freely at high speed but that will also create the fluid pressure necessary for effective damping;
   one or more tubes constructed of stainless steel braided line comprising every portion of the circuit that is outside the housing, wherein:
      the bottom of the rotatable wiper has a depression exposed to the outside of the housing through an aperture in said housing, with the depression constructed of such dimensions as to accommodate a stem nut at the top of a steering shaft;
   the remote control valve comprises:
      an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
         an upper locking segment; and
         a lower, removable locking segment;
      a spring placed in the cavity of said outer ring;
      a ball placed in the cavity of said outer ring so that said spring can urge a portion of said ball beyond the cavity of said outer ring;
      an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a hollow center;
      an o-ring placed in the lower groove of said inner shaft;
      another o-ring placed in the upper groove of said inner shaft;
      a disk-shaped handle attached to said inner shaft, said disk-shaped handle having a first side containing a series of discrete minor indentations located so as to have said ball urged against such minor indentations by said spring;
      a projection attached to and extending upward from the first side of said disk-shaped handle located so as to fit within the groove of said outer ring; and
      a means for retaining said inner shaft within said outer ring;
   a first attachment structure, which comprises:
      an upper attachment structure portion having a bottom with a depression in the bottom of said upper attachment structure portion; and
      a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:
the housing is connected to the lower attachment structure portion of said first attachment structure and to the lower attachment structure portion of said second attachment structure.

66. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.084 inch to 0.094 inch, inclusive of the end points for the range;

one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft;

the remote control valve comprises:
an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:
an upper locking segment; and
a lower, removable locking segment;
a spring placed in the cavity of said outer ring;
a ball placed in the cavity of said outer ring so that said spring can urge a portion of said ball beyond the cavity of said outer ring;
an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a hollow center;
an o-ring placed in the lower groove of said inner shaft;
another o-ring placed in the upper groove of said inner shaft;
a disk-shaped handle attached to said inner shaft, said disk-shaped handle having a first side containing a series of discrete minor indentations located so as to have said ball urged against such minor indentations by said spring;
a projection attached to and extending upward from the first side of said disk-shaped handle located so as to fit within the groove of said outer ring; and
a means for retaining said inner shaft within said outer ring;
a first attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;
a second attachment structure, which comprises:
an upper attachment structure portion having a bottom with a depression in the bottom of said upper attachment structure portion; and
a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and
a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

67. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.094 inch to 0.104 inch, inclusive of the end points for the range;

one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft;

the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and
a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a hollow center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring;

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

68. An improved fluidic stabilizer of the type having a housing containing a rotatable wiper within an interior chamber of the housing wherein the wiper has a bottom wherein the rotatable wiper sealingly divides the interior chamber into a first side and a second side, a circuit having an internal cross-sectional area and connecting the first side of the interior chamber to the second side of the interior chamber so that the first side of the interior chamber and the second side of the interior chamber are in fluid communication with one another, a remote control valve located at an intermediate portion of the circuit, and an arm connected to the wiper and available for connection to a portion of a vehicle that remains stationary with respect to a longitudinal axis of the vehicle when a steering mechanism of the vehicle rotates, in order to produce relative motion between the wiper and the housing when the housing is attached to a portion of a vehicle that rotates with respect to a longitudinal axis of the vehicle as part of the steering of the vehicle, wherein the improvement comprises:

having the internal cross-sectional area for every portion of the circuit within a range equivalent to the area of a circular cross section having a diameter of 0.104 inch to 0.125 inch, inclusive of the end points for the range;

one or more tubes constructed of stainless steel braided line comprising every portion of the circuit that is outside the housing, wherein:

the bottom of the rotatable wiper has a depression exposed to the outside of the housing through an aperture in said housing, with the depression constructed of such dimensions as to accommodate a stem nut at the top of a steering shaft;

the remote control valve comprises:

an outer ring having a mating surface containing a first aperture communicating with a first portion of the circuit between the housing and the remote valve, a second aperture communicating with a second portion of the circuit between the housing and the remote valve, a first outward lateral surface containing a groove which extends less than all the way around said outer ring and also containing a cavity; and an inward end, wherein said inward end comprises:

an upper locking segment; and
a lower, removable locking segment;

a spring placed in the cavity of said outer ring;

a ball placed in the cavity of said outer ring so that said spring can urge a portion of said ball beyond the cavity of said outer ring;

an inner shaft rotatably mounted within said outer ring, said inner shaft having a mating surface oriented toward the mating surface of said outer ring with such mating surface of said inner shaft having a first area where there is no intrusion into the inner shaft and then having a continuous indentation commencing and becoming increasingly deeper as such continuous indentation progresses around the inner shaft until the continuous indentation stops upon reaching the first area with a maximum cross-sectional area of the continuous indentation being no larger than a maximum cross-sectional area anywhere in the circuit, said inner shaft having a lower groove below the continuous indentation, said inner shaft having an upper groove above the continuous indention, and said inner shaft having a hollow center;

an o-ring placed in the lower groove of said inner shaft;

another o-ring placed in the upper groove of said inner shaft;

a disk-shaped handle attached to said inner shaft, said disk-shaped handle having a first side containing a series of discrete minor indentations located so as to have said ball urged against such minor indentations by said spring;

a projection attached to and extending upward from the first side of said disk-shaped handle located so as to fit within the groove of said outer ring; and a means for retaining said inner shaft within said outer ring;

a first attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle;

a second attachment structure, which comprises:

an upper attachment structure portion having a bottom with a depression in the bottom of said upper attachment structure portion; and a lower attachment structure portion having a top with a depression in the top of said lower attachment structure portion such that when said lower attachment structure portion has been connected to said upper attachment structure portion, the depression in the bottom of said upper attachment structure portion and the depression in the top of said lower attachment structure portion substantially adjoin in order to accommodate the handlebars of a vehicle; and a central segment joining the lower attachment structure portion of said first attachment structure to the lower attachment structure portion of said second attachment structure; and wherein:

the housing is connected to the lower attachment structure portion of said first attachment structure and to the lower attachment structure portion of said second attachment structure.

\* \* \* \* \*